No. 746,440. PATENTED DEC. 8, 1903.
W. L. AUSTIN.
JOINT FOR CONTAINERS.
APPLICATION FILED MAR. 27, 1902.
NO MODEL. 2 SHEETS—SHEET 1.
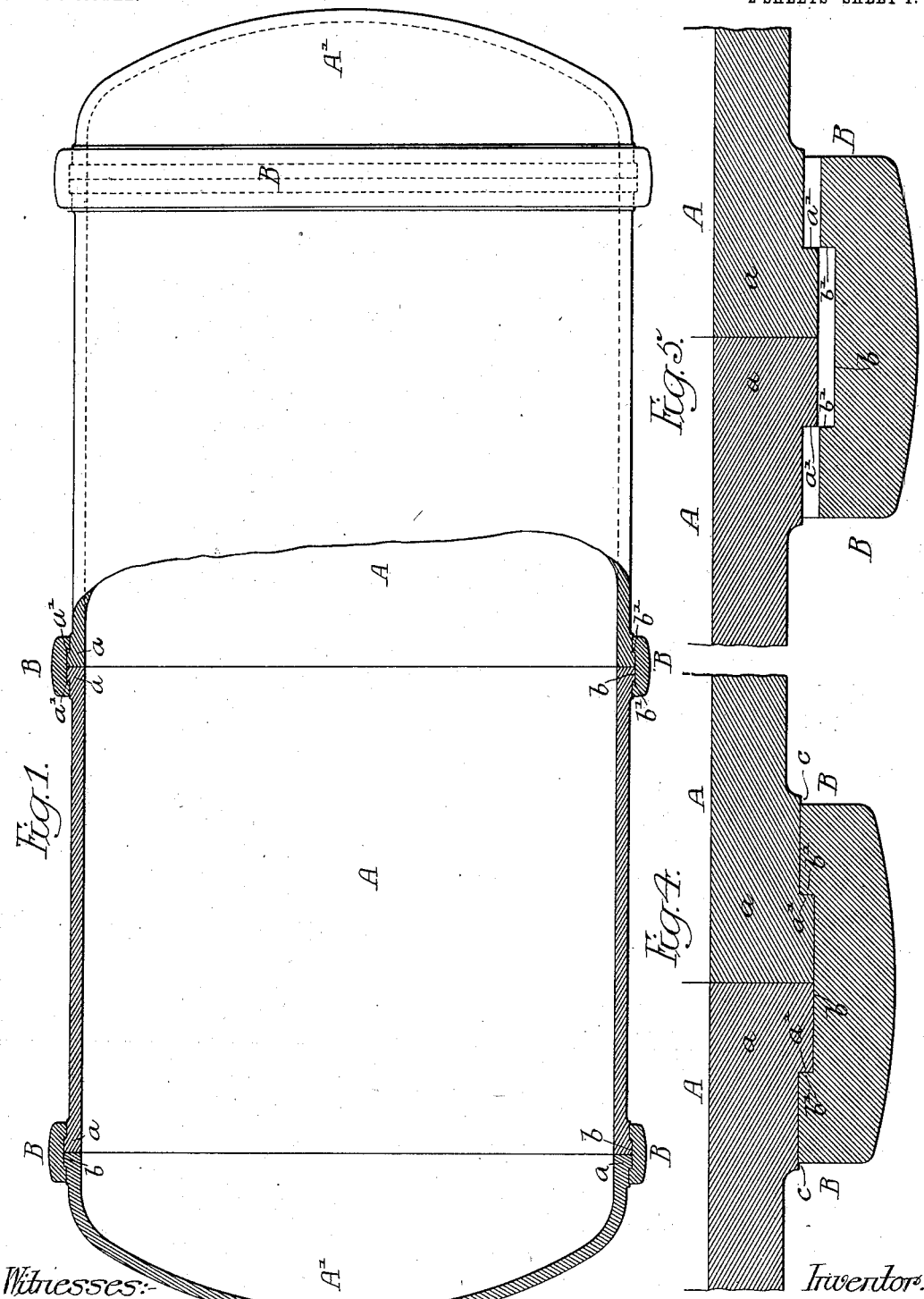
Witnesses:-
Inventor:-
William L. Austin,
by his Attorneys;

No. 746,440. PATENTED DEC. 8, 1903.
W. L. AUSTIN.
JOINT FOR CONTAINERS.
APPLICATION FILED MAR. 27, 1902.
NO MODEL. 2 SHEETS—SHEET 2.
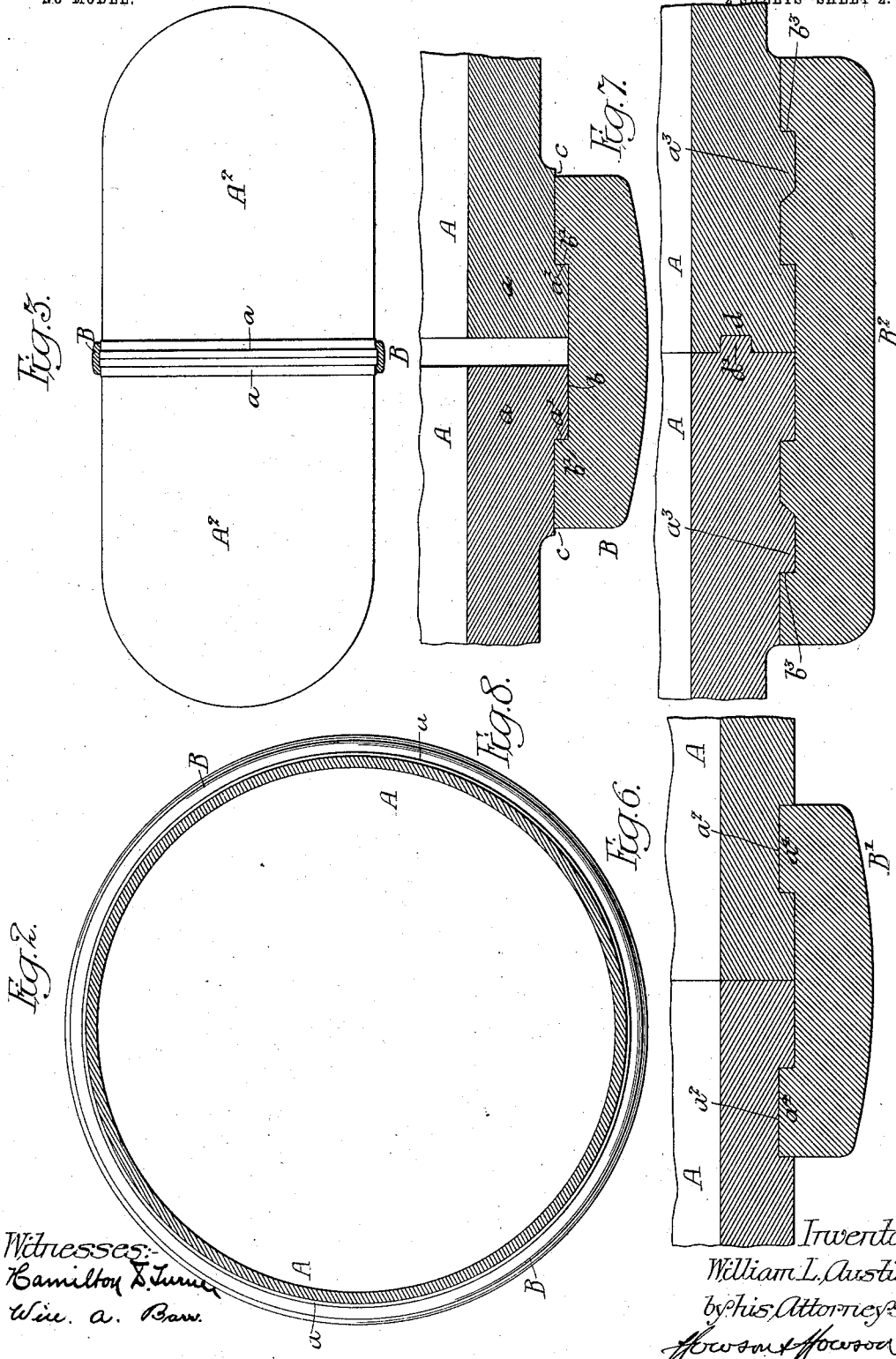

No. 746,440. Patented December 8, 1903.

UNITED STATES PATENT OFFICE.

WILLIAM L. AUSTIN, OF PHILADELPHIA, PENNSYLVANIA, ASSIGNOR TO BURNHAM, WILLIAMS & COMPANY, OF PHILADELPHIA, PENNSYLVANIA, A FIRM.

JOINT FOR CONTAINERS.

SPECIFICATION forming part of Letters Patent No. 746,440, dated December 8, 1903.

Application filed March 27, 1902. Serial No. 100,335. (No model.)

*To all whom it may concern:*

Be it known that I, WILLIAM L. AUSTIN, a citizen of the United States, residing in Philadelphia, Pennsylvania, have invented certain Improvements in Joints for Containers, of which the following is a specification.

The object of my invention is to dispense with the use of rivets or bolts in the circumferential joints of pressure cylinders, boilers, tanks, and other containers. This object I attain by securing the several sections together by rings shrunk upon the sections, as fully described hereinafter, reference being had to the accompanying drawings, in which—

Figure 1 is a longitudinal sectional view of a compressed-air cylinder, illustrating my invention. Fig. 2 is a sectional view on the line 2 2, Fig. 1. Fig. 3 is a sectional view of another form of compressed-air cylinder. Fig. 4 is an enlarged view of the joint shown in Fig. 1. Fig. 5 is a similar view showing the position of the ring before it is shrunk upon the joint, and Figs. 6, 7, and 8 are views of modifications of the joint.

Heretofore the common practice in the manufacture of vessels for containing a fluid under high pressure has been to make the joints of the sections lap and riveting with two or more rows of rivets, or the sections have been flanged and a series of longitudinal bolts used to secure the flanges together. Both of these forms are objectionable, in that it is very difficult to keep the joints absolutely tight and leaks will occur, and in pressure-tanks for compressed air particularly this is a great objection.

By my invention I dispense entirely with rivets or bolts and with open seams.

A A in the present instance are cylindrical sections of cast-steel. Each section is preferably thickened at the end to form a flange $a$, which has a shoulder $a'$. The extent of this shoulder will depend entirely upon the diameter of the cylinder, which controls the amount of shrinkage of the ring applied to the cylinder. The contact-surfaces of each section are turned true, so as to form a tight joint.

B is a ring having in the present instance an internal groove $b$, forming annular flanges at each side of the ring. The ring is bored out to fit the finished portion of the flanges $a$ of the cylinders A. The parts are so proportioned that the ring when expanded by heat will slip over the flanges of the cylindrical sections A, as in Fig. 5, and as the ring cools it will shrink upon the flanges of the cylindrical sections and bind tightly thereon, as in Fig. 4, forming an absolutely tight joint, the shoulders $b'$ of the ring passing the shoulders $a'$ of the sections A A, as illustrated clearly in Fig. 3, the bored portion of the ring fitting the turned contact-surfaces of the sections and the shoulders $b'$ of the ring fitting tightly against the shoulders of the said sections.

If for any reason a leak should occur, the joint can be readily calked at $c$ $c$, Fig. 4.

In Fig. 1 I have shown a container having two intermediate sections A and two head-sections A', secured together by the joint-rings B. It will be understood that the container may have as many cylindrical sections as desired, according to the length of the container, and the heads may be shaped to any form.

In Fig. 3 I have shown a container made of cast-steel or other metal and having two sections $A^2$, each having a flange, as shown in Fig. 4, connected together by a ring B. In this instance each head is formed as a part of the cylindrical body portion.

In Fig. 6 I have shown a slight modification of the joint in which the external flange on each cylindrical section is formed by making an annular groove $a^2$ in the section and fitting the internal flange $a^4$ of the ring B' thereto.

In Fig. 7 I have shown still another modification where an extended shoulder is desired, so as to increase the resistance. This is accomplished by providing additional shoulders $a^3$ on the cylindrical sections, each bearing against a shoulder $b^3$ on the ring $B^2$. It will be understood that as many shoulders may be provided as desired, and, as remarked above, the depth of the shoulder will depend entirely upon the diameter and the shrinkage of the ring.

In Figs. 4 and 5 I have shown the two sections A A one abutting the other with a plain joint, while in Fig. 7 I have shown an annular recess $d$ in one section into which fits an annular tongue on the other section, as it will be understood that the joint may be plain, as shown in Fig. 3, or made with a tongue-and-groove joint, if desired.

While I prefer the joint shown in Fig. 4, I may in some instances make the joint, as in Fig. 8, with a space between the two sections, as a tight joint is formed between the trued surfaces of the sections and the ring.

It will be understood that my invention can be applied to either cast or wrought metal containers and that the container can be used either for compressed air, steam, or water or for any purpose where it is desired to use a container made of sections secured together.

I claim as my invention—

1. The combination in a container, of two sections, each section having an external flange forming a shoulder, with a metal ring having an internal groove forming annular flanges at each side, the flanges of the sections and the flanges of the ring being so proportioned that the ring will slip over the flanges of the cylindrical sections when heated, said ring being shrunk upon the sections and binding tightly upon the flanged portions thereof, thereby forming a tight joint, substantially as described.

2. The combination in a container, of two sections having external flanges at their abutting ends forming shoulders, the said flanges and part of each container being turned true, with a metal ring having an internal annular groove therein forming flanges at each side, the said ring being bored to fit the flanged portions of the container and so proportioned that when heated it will expand sufficiently to pass over the flanged portions of the container and shrunk upon the flanged portions, the machined surfaces of both the ring and the container making an extended tight joint, substantially as described.

3. The combination in a container made in two sections, each section having a stepped flange forming a shoulder, each step being turned true, with a metal ring having an internal annular groove therein forming flanges at each side, the surfaces of the grooves and the flanges being also turned true so as to make a tight joint between the entire internal surface of the ring and the flanged portions of the container, said ring being shrunk upon the container, thereby forming a tight joint, substantially as described.

4. The combination in a container, of two sections, the abutting faces of said sections being machined so as to make a tight joint, each section having a stepped external flange forming a shoulder, the flange being turned true, a metal ring having an internal annular groove forming flanges at each side, the internal portion of the ring also being turned true to fit the flanged portions of the container, said ring being shrunk upon the sections of the container, thereby drawing them together and forming a tight joint, substantially as described.

5. The combination in a container, of two sections, each section having a series of external flanges forming shoulders, with a metal ring grooved to form a series of annular flanges at each side, the flanges of the sections and the flanges of the ring being so proportioned that the rings will fit over the flanges of the cylinder-sections and bind tightly upon the flanged portions thereof, said ring being shrunk upon the sections and binding tightly upon the flanged portions thereof, thereby forming a tight joint, substantially as described.

In testimony whereof I have signed my name to this specification in the presence of two subscribing witnesses.

WM. L. AUSTIN.

Witnesses:
 WM. PENN EVANS,
 KENNETH RUSHTON.